US012584798B2

(12) United States Patent
Liu et al.

(10) Patent No.: US 12,584,798 B2
(45) Date of Patent: Mar. 24, 2026

(54) PROTECTIVE TUBE, TEMPERATURE MEASUREMENT ARRANGEMENTS AND METHODS FOR TEMPERATURE MEASUREMENTS IN A PROCESS VESSEL

(71) Applicant: WIKA Alexander Wiegand SE & Co. KG, Klingenberg/Main (DE)

(72) Inventors: Yunbo Liu, Beijing (CN); Song Zhang, Suzhou (CN); Tao Lin, Suzhou (CN)

(73) Assignee: Wika Alexander Wiegand SE & Co. KG, Klingenberg/Main (DE)

( * ) Notice: Subject to any disclaimer, the term of this patent is extended or adjusted under 35 U.S.C. 154(b) by 681 days.

(21) Appl. No.: 17/865,900

(22) Filed: Jul. 15, 2022

(65) Prior Publication Data

US 2023/0016861 A1    Jan. 19, 2023

(30) Foreign Application Priority Data

Jul. 15, 2021    (CN) .......................... 202110800871.1

(51) Int. Cl.
G01K 1/14 (2021.01)
G01K 1/02 (2021.01)

(52) U.S. Cl.
CPC ............... G01K 1/14 (2013.01); G01K 1/026 (2013.01)

(58) Field of Classification Search
CPC ............. G01K 1/026; G01K 1/14; G01K 7/04
See application file for complete search history.

(56) References Cited

U.S. PATENT DOCUMENTS

| | | | | | |
|---|---|---|---|---|---|
| 4,483,631 | A | * | 11/1984 | Kydd | G01K 7/08 |
| | | | | | 374/E1.005 |
| 4,776,705 | A | * | 10/1988 | Najjar | G01K 1/10 |
| | | | | | 374/139 |
| 5,192,132 | A | * | 3/1993 | Pelensky | G01K 7/06 |
| | | | | | 374/166 |
| 5,232,517 | A | | 8/1993 | Hilborn et al. | |
| 10,175,117 | B2 | | 1/2019 | Branken et al. | |
| 10,712,205 | B2 | | 7/2020 | Del Bianco | |
| 2002/0182119 | A1 | | 12/2002 | Daily et al. | |
| 2012/0213249 | A1 | * | 8/2012 | Kanno | F27D 19/00 |
| | | | | | 374/E7.004 |
| 2021/0389188 | A1 | * | 12/2021 | Liu | G01K 1/024 |

FOREIGN PATENT DOCUMENTS

| | | | |
|---|---|---|---|
| EP | 3118595 | A1 | 1/2017 |
| KR | 102065063 | B1 | 1/2020 |

* cited by examiner

*Primary Examiner* — Mirellys Jagan
(74) *Attorney, Agent, or Firm* — Muncy, Geissler, Olds & Lowe, P.C.

(57) ABSTRACT
A protective tube for sealed introduction into a process vessel at a process vessel port, the protective tube comprising a sealing base element which is connected onto the process vessel port and an elongate body with a bore. The elongate body comprises a closed distal end and an open proximal end, which is sealingly connected onto the sealing base element. The protective tube also comprises a receiving part, which is connected or attached onto the elongate body inside the process vessel so as to receive and hold a secondary temperature sensor from inside the process vessel. In addition, a reference temperature sensor is insertable into the bore from outside the process vessel. Also provided is a temperature measurement arrangement and a method for a temperature measurement in a process vessel.

7 Claims, 6 Drawing Sheets

PROTECTIVE TUBE, TEMPERATURE MEASUREMENT ARRANGEMENTS AND METHODS FOR TEMPERATURE MEASUREMENTS IN A PROCESS VESSEL

This nonprovisional application claims priority under 35 U.S.C. § 119(a) to Chinese Patent Application No. 202110800871.1, which was filed in China on Jul. 15, 2021, and which is herein incorporated by reference.

BACKGROUND OF THE INVENTION

Field of the Invention

The present invention relates to a protective tube, a temperature measurement arrangement and a method for a temperature measurement in a process vessel.

Description of the Background Art

A temperature measurement arrangement with a temperature sensor arrangement is usually used to measure the temperature at a given location in a process vessel, like e.g. furnaces, reactors and so on. Due to the problems of chemical reaction, high temperature and high corrosion and other influences that typically occur in the process vessel, it is necessary to ensure the accuracy and stability of a sensor signal for measuring temperature during the process. Especially, a sensor assembly may lead to a measurement signal error or failure due to factors such as aging and/or temperature signal drift during the process.

To measure the temperature on large process vessels, e.g., in furnaces or reactors, it is known to introduce multiple temperature sensor assemblies into the process vessels, via multiple process vessel ports at different locations. Each temperature sensor assembly may comprise multiple individual temperature sensors, which are sometimes also referred to as temperature sensor bundles. Each temperature sensor is routed inside the process vessel to an individual location, where it is positioned to measure the local temperature.

SUMMARY OF THE INVENTION

It is therefore an object of the present invention to provide a temperature measurement system and a temperature measurement method, which is adapted to continuously measure temperature signal errors of each temperature measurement element constituting the temperature measurement system of a process vessel without interrupting the process in the process vessel, and know about the influence of factors such as aging of the temperature measurement elements or signal drift and the like on the accuracy of temperature signals in real time.

The inventive concept of the present invention is based on, for example, at least the following principles: a spatial position is randomly selected in a process vessel, a plurality of temperature sensors from different temperature sensor assemblies measure in that spatial position or spatial areas adjacent thereto, output their respective temperature signals and transmit their respective temperature signals back to their respective temperature sensor assemblies, and temperature signals of the different temperature sensors are compared, so as to be able to compare temperature signal discrepancies of the different temperature sensors at the same location, and then obtain a relative deviation between the temperature signals of the two temperature sensors.

Based on the inventive concept above, the present invention provides a protective tube, a temperature measurement arrangement and a method for a temperature measurement in a process vessel.

According to a first aspect of the present invention, the protective tube is sealingly introduced into a process vessel at a process vessel port. The protective tube comprises a sealing base element connected onto the process vessel port and an elongate body with a bore.

Said sealing base element is preferably a flange element. The elongate body is preferably a thermowell. At least one process vessel port is preferably a flange connection. Such flange connections allow for a reliable, sealing connection.

The elongate body comprises a closed distal end and an open proximal end, which is sealingly connected onto the sealing base element. Therefore, such an internal volume of the elongate body or the bore is accessible from the outside of the process vessel through an opening in the sealing base element.

A reference temperature sensor is insertable into the bore of the protective tube from the outside of the process vessel and is also extractable or removable from the protective tube from the outside of the process vessel without stopping the process in the process vessel. Therefore, the reference temperature sensor can be introduced or removed at any time during normal operation of the process vessel.

The protective tube also comprises a receiving member, which is or can be connected or attached onto the elongate body inside the process vessel so as to receive and hold a secondary temperature sensor from the inside of the process vessel. This means that, in contrast to the reference temperature sensor, the secondary temperature sensor at least partially operates inside the process vessel before reaching and entering the receiving member.

Because of the design of the protective tube and receiving member, the secondary temperature sensor and the reference sensor are exposed to very similar, if not identical conditions. Therefore, when the sensor signal of both sensors is acquired and evaluated to actual temperature values, the reference sensor can be used to calibrate the secondary sensor and/or to detect the occurrence of aging or signal drift of the secondary sensor.

Preferably, the reference temperature sensor is a high-accuracy temperature sensor and/or, particularly preferably, the accuracy of the reference temperature sensor is higher than the accuracy of the secondary temperature sensor. Therefore, the calibration of the secondary sensor can be done effectively and reliably.

Preferably, the reference temperature sensor is of a different kind from the secondary temperature sensor. For example, one of the secondary temperature sensors and the reference temperature sensor may be a thermocouple sensor and the other one may be a resistance temperature sensor. Both the secondary temperature sensor and the reference temperature sensor can also be a thermocouple sensor, but they are different types of thermocouple sensors respectively. By the use of different kind of sensors, a similar aging and/or signal drifting behavior of the reference sensor and secondary sensor can be prevented, as different types of sensors typically age and/or drift in different ways. Therefore, the reference sensor can be used for an effective detection of aging and/or signal drifting effects, even when both sensors are operated in parallel for a longer period of time.

The receiving member may comprise a tubular body with a bore and an open first end through which the secondary temperature sensor may be inserted into the bore. The other end of the tubular body can be closed or open. In the case of an open end, the temperature measurement sensor may protrude from that second end.

However, it is preferable that the second end is closed, so that a sensor element of the temperature sensor for measurement is surrounded by the receiving member. In this way, good heat transfer performance, mechanical protection and temperature stability between the temperature sensor for measurement and the reference temperature sensor can be realized through heat conduction capabilities of the receiving member and the protective tube. Therefore, comparability of both sensors is improved.

The receiving member may be oriented in parallel to a longitudinal axis of the elongate body of the protective tube, perpendicular to the longitudinal axis of the elongate body, or at an included angle. In addition, the receiving member may be connected onto the elongate body at a lateral surface of the elongate body or at the closed distal end of the protective tube.

The receiving member and/or the closed distal end may at least partially comprise a material with high thermal conductivity, so as to quickly balance a temperature change or a temperature difference between the secondary temperature sensor received and held by the receiving member and the reference temperature sensor within the protective tube.

The receiving member may be set up to receive at least two secondary temperature sensors. Especially in applications where the secondary temperature sensors do not need to be mechanically shielded or protected, the receiving member can only be presented as a clamp, a bracket or an annular body, so that one or more secondary temperature sensors can be simply fastened onto the lateral surfaces of the elongate body of the protective tube. In that way, the receiving member can be manufactured and installed at very low costs. In addition, at least another receiving member may be attached or connected onto the elongate body of the protective tube inside the process vessel in order to receive and hold at least another secondary temperature sensor. In this embodiment, one reference sensor can advantageously be used to calibrate multiple secondary sensors at the same time and/or detect aging or signal drifting effects of multiple secondary sensors at the same time, therefore increasing efficiency and lowering installation costs.

The open proximal end of the elongate body of the protective tube may be sealingly closable from the outside of the process vessel. Especially when the reference temperature sensor is not inserted, or when the reference temperature sensor has been inserted for a long time, the open end of the protective tube can be closed to prevent the risk that the elongate body may be damaged. In this case, no fluid can leave the process vessel.

Preferably, the bore of the protective tube is in fluid communication with a pressure gauge or a pressure sensor for monitoring the internal pressure within the bore, and the pressure gauge may be arranged outside the process vessel and in fluid communication with the bore; Or the pressure sensor can also be installed outside the process vessel or even integrated into the elongate body. It is also conceivable that the bore of the protective tube is in fluid communication with a gas analyzer for monitoring the gas composition in the bore and/or an inert gas purging arrangement for purging the gas in the bore.

In this way, the integrity of the protective tube can be monitored. For example, when the open end is closed, and the pressure in the bore rises or the concentration of toxic gas in the air in the bore rises, it indicates that there may be a leakage, and as long as the process is going on, the protective tube should not be opened from the outside of the process vessel. Therefore, safety of the protective tube is improved.

According to a second aspect of the present invention, a temperature sensor arrangement is used to measure a temperature within a process vessel, which comprises at least two process vessel ports at different locations.

The temperature sensor arrangement may comprise a plurality of temperature sensor assemblies. The temperature sensor assemblies are inserted into the process vessel at or through each different process vessel port.

Each temperature sensor assembly may comprise at least one primary temperature sensor, which is positioned at a measurement location within the process vessel. At least one of the temperature sensor assemblies may comprise at least one secondary temperature sensor. Each of the secondary temperature sensors of a corresponding temperature sensor assembly may be positioned close to a measurement location of one of the primary temperature sensors from a different one of the temperature sensor assemblies. If at least two temperature sensor assemblies comprise at least one secondary sensor, the secondary sensor can be positioned close to a common reference location of one of the secondary temperature sensors from a different one of the temperature sensor assemblies. Preferably, secondary sensors from multiple temperature sensor assemblies are located together at such a common reference location.

Such arrangements are referred to as "cross installation" in the present invention, that is, the secondary temperature sensors are close to the primary or secondary temperature sensor from another adjacent temperature sensor assembly within the process vessel. One of the advantages of this aspect of the invention is that the installation of redundant temperature sensors is more reliable. Especially when one primary temperature sensor is damaged, the nearby secondary temperature sensors still work and can continue the measuring task of the failed primary sensor.

Preferably, at least one of the secondary temperature sensors of one of the temperature sensor assemblies is in direct mechanical contact with the primary temperature sensor or the secondary temperature sensor from a different one of the temperature sensor assemblies, which is positioned close. Because in this case, the two temperature sensors in direct mechanical contact experience almost the same temperature, the advantage above is further improved.

Preferably, the temperature sensor arrangement further comprises a protective tube according to the first aspect of invention. The protective tube is inserted into the process vessel at or through another process vessel port. A temperature sensor assembly may be inserted into the process vessel at or through the same process vessel port or at or through at least one other process vessel port.

At least one secondary temperature sensor can be fixed within the process vessel to reach the receiving member of the protective tube. The receiving member can receive and hold the secondary temperature sensor and make the secondary temperature sensor close to the reference temperature sensor within the bore of the protective tube.

Preferably, all of the temperature sensor assemblies comprise secondary temperature sensors. These secondary temperature sensors are fixed in such a way that they are received by the receiving members of the protective tube with the reference temperature sensor, where measurement signals of the secondary temperature sensors can be compared with the measurement signal of the reference temperature sensor, thus calibrating or adjusting the secondary temperature sensors and/or detecting aging or signal drifting effects.

If an offset is detected between the secondary temperature sensors and the reference temperature sensor, the offset can be used to adjust signals of all sensors from the same temperature sensor assembly, because they are all influenced by similar temperature and environmental conditions.

One of the temperature sensor assemblies can be inserted into the process vessel from the same process vessel port as the protective tube. The receiving member may receive and hold a short primary temperature sensor or a secondary temperature sensor of that temperature sensor assembly.

Preferably, at least one temperature sensor assembly comprises a sheathed single-point thermocouple temperature sensor. A thermocouple junction in the sheath forms one of the primary temperature sensors or one of the secondary temperature sensors.

At least one temperature sensor assembly can comprise a sheathed multi-point thermocouple temperature sensor. A series of thermocouple junctions in the sheath are arranged and distributed along a length of the sheath, forming a series of primary temperature sensors and/or a series of secondary temperature sensors.

Also, at least one temperature sensor assembly can comprise a bundle of at least two sheathed thermocouple temperature sensors.

Preferably, at least one temperature sensor assembly comprises at least two primary temperature sensors, which are arranged at different measurement locations. The measurement locations are arranged and distributed along a line essentially parallel or essentially perpendicular to a longitudinal axis of the process vessel or distributed within one or more planes arranged essentially perpendicular to the longitudinal axis of the process vessel.

Preferably, the primary temperature sensors and/or the secondary temperature sensors of one of the temperature sensor assemblies are of a different type than the primary temperature sensors and/or the secondary temperature sensors of one of the other temperature sensor assemblies. By the use of different kind of sensors, a similar aging and/or signal drifting behavior of the primary and/or secondary sensors from different temperature sensor assemblies can be prevented, as different kinds of sensors typically age and/or drift in different ways. In other words, the ability of this embodiment of the "cross installation" arrangement to detect the occurrence of aging or signal drifting effects of one or more temperature sensors is further improved, as the usage of different kinds of temperature sensors may virtually provoke the occurrence of measurement value differences between primary and/or secondary sensors of different temperature sensor assemblies, whenever aging and/or signal drifting occurs, as the different kinds of sensors will age and/or drift differently.

According to a third aspect of the present invention, a method for a temperature measurement in a process vessel with a temperature measurement arrangement according to the present invention comprises the steps of:

A) Taking measurement values of primary temperature sensors and secondary temperature sensors within the process vessel;

B) Determining a measurement value difference of primary temperature sensors and secondary temperature sensors of different temperature sensor assemblies, which are positioned close to each other at certain measurement locations, or determining a measurement value difference of secondary temperature sensors of different temperature sensor assemblies, which are positioned close to each other at certain reference positions;

C) Storing the determined measurement value differences as reference values;

D) Repeating, at a later point in time, the steps A) and B), and;

E) Comparing the newly determined measurement value differences to the initially stored reference values to detect a discrepancy in measurement values and/or sensor condition.

With this method, the occurrence of measurement value discrepancies, aging and/or signal drift of one or more sensors, or the failure of one or more sensors, can be detected effectively. The operator of a temperature measurement arrangement that makes use of this method is able to detect first signs of aging, signal drift and/or impending failure early and can plan maintenance accordingly.

According to another aspect of the present invention, a method for a temperature measurement in a process vessel comprising at least two process vessel ports at different locations comprises steps of:

A) Inserting a temperature sensor assembly at or through each process vessel port into the process vessel, whereas each temperature sensor assembly comprises at least one primary temperature sensor, and at least one of the temperature sensor assemblies comprises at least one secondary temperature sensor;

B) Positioning each primary temperature sensor at a measurement location inside the process vessel, C) Positioning each secondary temperature sensor of a temperature sensor assembly comprising at least one secondary temperature sensor close to the measurement location of one of the primary temperature sensors from a different one of the temperature sensor assemblies or close to a reference measurement location of one of the secondary temperature sensors from a different one of the temperature sensor assemblies;

D) Taking measurement values of primary temperature sensors and secondary temperature sensors within the process vessel;

E) Determining a measurement value difference of primary temperature sensors and secondary temperature sensors of different temperature sensor assemblies, which are positioned close to each other at certain measurement locations, or determining a measurement value difference of secondary temperature sensors of different temperature sensor assemblies, which are positioned close to each other at certain reference positions.

Thereby, measurement value discrepancies of individual temperature sensors and/or individual temperature sensor assemblies are detected.

Preferably, the method also comprises steps of inserting a standard temperature sensor with a known accuracy into a protective tube inserted into the process vessel as a primary temperature sensor without interrupting the process in the process vessel, at the same time recording measurement values of that primary temperature sensor and one or more secondary temperature sensors located at the same or adjacent location, and comparing the measurement values of the primary temperature sensor and the one or more secondary temperature sensors to determine measurement errors of the secondary temperature sensors.

Further, the temperature measurement arrangement of the present invention further comprises a controller that is adapted to execute at least one of the above mentioned methods automatically, to further reduce operation costs. Such controller may be part of a sensor transmitter, which is connected to the temperature sensor arrangements, part of a field device, or part of a remote unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
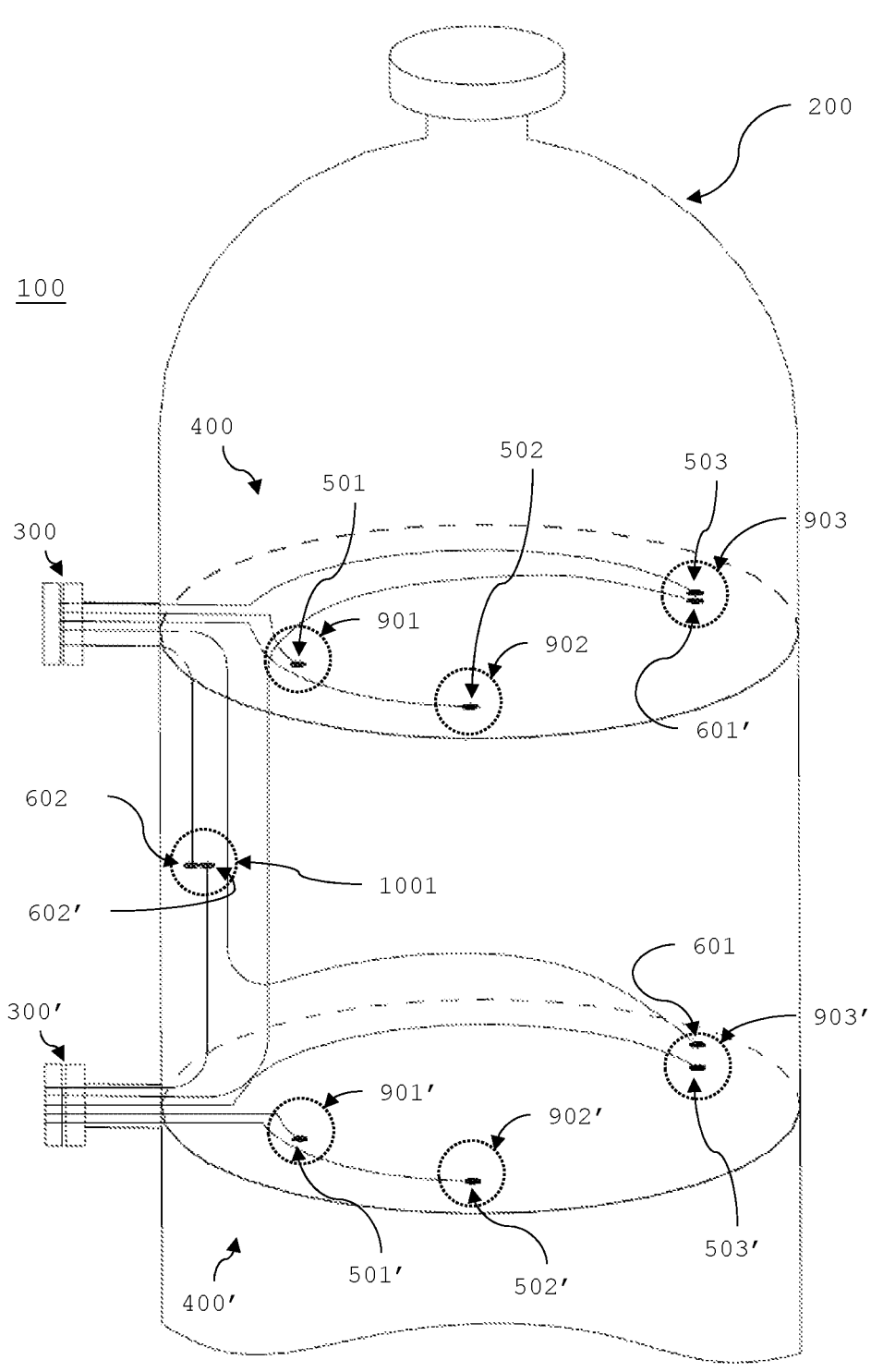
FIG. 1 shows a temperature sensor arrangement in a first aspect of the invention.
Figure 5:
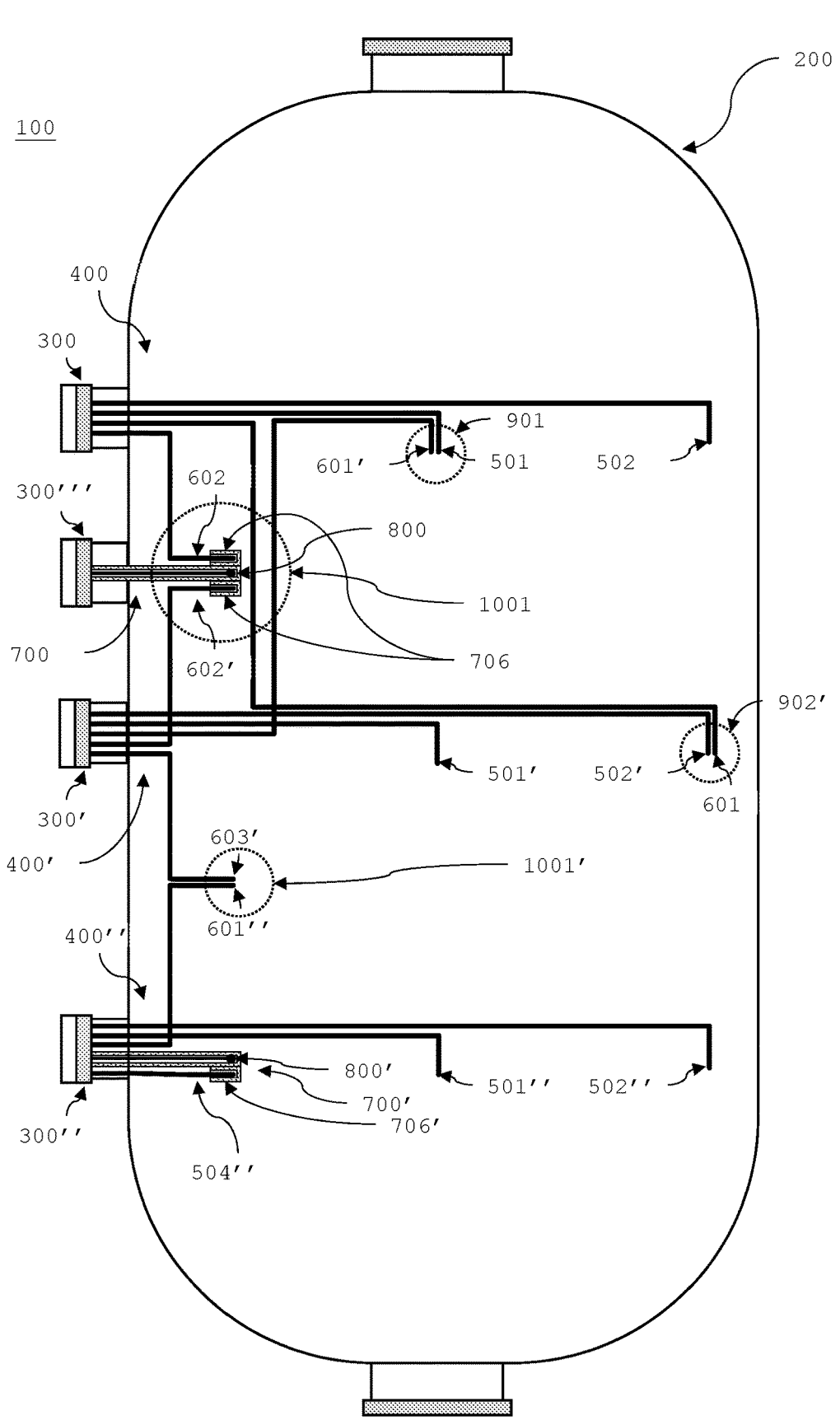
FIG. 5 shows a temperature sensor arrangement in a combination of several aspects of the invention.

FIG. 1 shows an example of a temperature sensor arrangement 100 of the present invention. The temperature sensor arrangement 100 is used to measure a temperature in a process vessel 200. The process vessel 200 comprises two process vessel ports 300, 300' at different locations. There may also be a plurality of process vessel ports as shown in FIG. 5. Temperature sensor assemblies 400, 400' of the temperature sensor arrangement 100 are inserted into the process vessel 200 at or through each process vessel port 300, 300'. Each temperature sensor assembly 400, 400' comprises at least one primary temperature sensor 501, 502, 503, 501', 502', 503', respectively, which is positioned at a measurement location 901, 902, 903, 901', 902', 903' within the process vessel 200. The measurement locations 901, 902, 903, 901', 902', 903' may be distributed in a plane arranged essentially perpendicular to a longitudinal axis of the process vessel 200, and may also be arranged and distributed along a line essentially parallel to or essentially perpendicular to the longitudinal axis of the process vessel 200. For the sake of clarity, the measurement locations 901, 902, 903, 901', 902', 903' are indicated in this figure as dotted circles.

The temperature sensor assemblies 400, 400' respectively comprise a secondary temperature sensor 601, 602, 601' and 602'. The secondary temperature sensors 601, 602, 601', 602' of each temperature sensor assembly 400, 400' are positioned close to the measurement location 901, 902, 903, 901', 902', 903' of one of the primary temperature sensors of a different one of the temperature sensor assemblies 400, 400', or positioned close to a reference location 1001, 1001' of one of the secondary temperature sensors of a different one of the temperature sensor assemblies 400, 400'.

As shown in FIG. 1, the secondary temperature sensor 601 of the temperature sensor assembly 400 is positioned close to the measurement location 903' of the primary temperature sensor 503' of the temperature sensor assembly 400'. The secondary temperature sensor 602' of the temperature sensor assembly 400' is positioned close to the reference location 1001 of the secondary temperature sensor 602 of the temperature sensor assembly 400. One may also refer to this reference location 1001 as a 'common' reference location.

In this arrangement, the secondary temperature sensors are fixed close to the primary or secondary temperature sensor from another adjacent temperature sensor assembly within the process vessel 200. This arrangement can also be referred to as "cross installation" in this application. An advantage of this arrangement is that the installation of such redundant sensors is more reliable, because when one primary temperature sensor is damaged, the nearby secondary temperature sensors thereof can still work. Furthermore, measurement values of primary and/or secondary sensors from different sensor assemblies, that are positioned close to each other, can be compared to detect signs of measurement value discrepancies, aging, signal drift and/or failure or one of the sensors.

Preferably, at least one secondary temperature sensor of one temperature sensor assembly is in direct mechanical contact with the primary temperature sensor or the secondary temperature sensor of another temperature sensor assembly. This further improves the advantage above, because the two temperature sensors will experience almost the same temperature.

Figure 2:
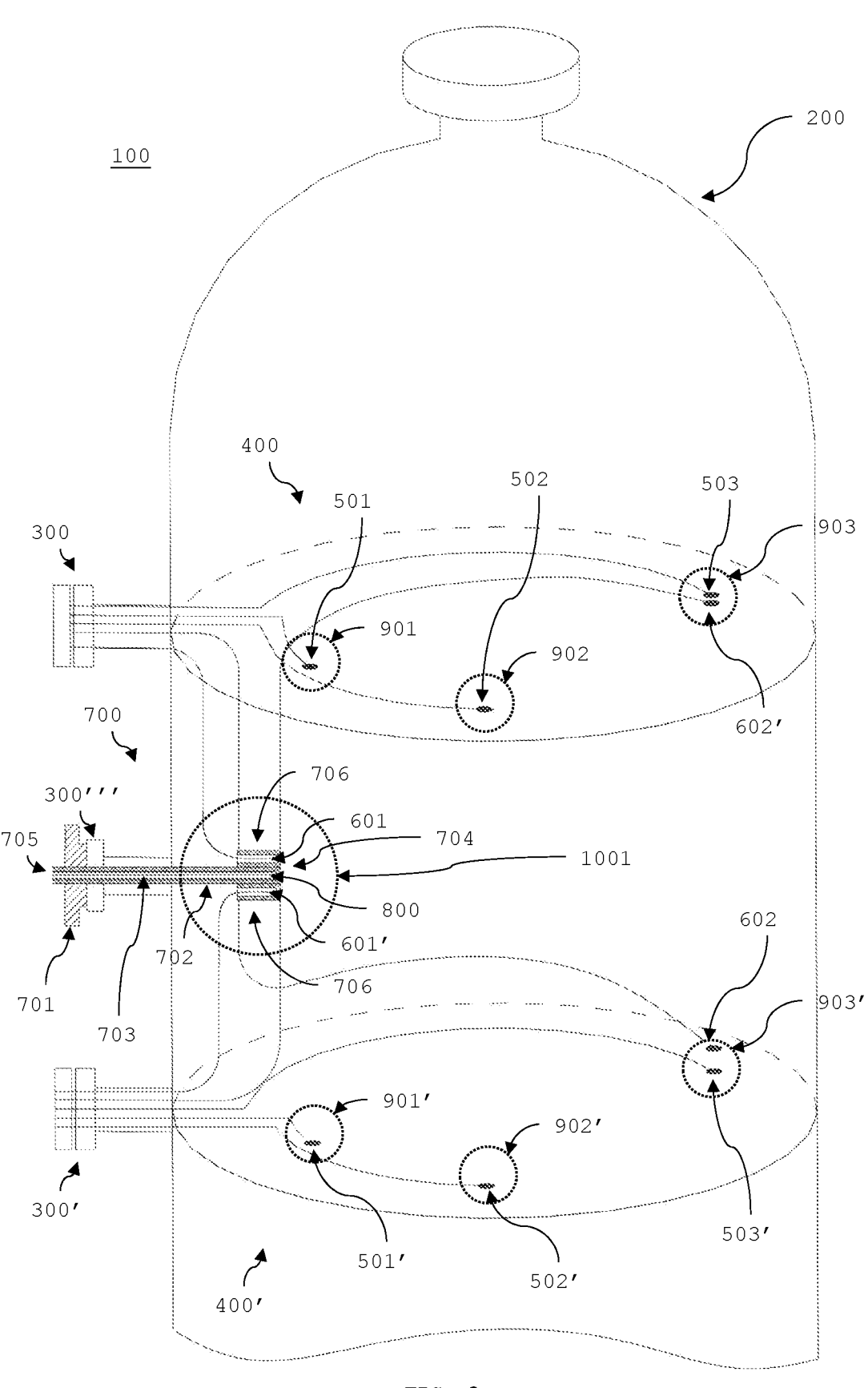
FIG. 2 shows a temperature sensor arrangement with a protective tube.

FIG. 2 shows a temperature sensor arrangement 100 with a protective tube 700. In this embodiment, the process vessel 200 also comprises another process vessel port 300'''. The protective tube 700 is sealingly inserted into the process vessel 200 at or through that process vessel port 300'''.

The protective tube 700 comprises a sealing base element 701 connected onto the process vessel port 300''' and an elongate body 702 with a bore 703. The elongate body is preferably a thermowell. The elongate body 702 comprises a closed distal end 704 and an open proximal end 705, which is sealingly connected onto the sealing base element 701. Therefore, this bore 703 or an internal volume is accessible from the outside of the process vessel 200 through an opening 705 in the sealing base element 701.

A reference temperature sensor 800 is insertable into the bore 703 from the outside of the process vessel 200. Similarly, the reference temperature sensor 800 is also extractable from the protective tube 700 from the outside of the process vessel 200, and such insertion and extraction need not stop or shutdown of the process in the process vessel 200.

The protective tube 700 also comprises one or more receiving members 706 which is/are connected or attached onto the elongate body 702 inside the process vessel 200 so as to receive and hold the secondary temperature sensors (referring to FIG. 2, the secondary temperature sensors 601 and 601' of the temperature sensor assemblies 400 and 400') from the inside of the process vessel 200. The receiving members 706 receive and hold the secondary temperature sensors 601 and 601' in such a way that they are close to the reference temperature sensor 800 within the bore 703 of the elongate body 702 of the protective tube 700.

Preferably, the reference temperature sensor 800 is a high-accuracy temperature sensor. Preferably, the accuracy of the reference temperature sensor is higher than that of the secondary temperature sensor 601, 601'. Preferably, the reference temperature sensor 800 is of a different type from the secondary temperature sensors 601, 601'. Said different type means that if the secondary temperature sensor 601, 601' is a thermocouple sensor, the reference temperature sensor 800 can be a different type of thermocouple sensors (for example, K, J, N, T type), or they belong to different types of sensors, for example one is a thermocouple sensor and the other one is resistance temperature sensor, for example, a Pt100 temperature sensor.

The receiving member 706 comprises a tubular body with a bore and an open first end. The secondary temperature sensors 601 and 601' are insertable into the bore through the open first end. This means that due to the arrangement and function of the receiving member 706, in contrast to the reference temperature sensor 800, the secondary temperature sensors can at least partially operate inside the process vessel 200 before reaching and completely entering the receiving member 706.

The other end of the tubular body can be closed or open. In the case of an open end, a temperature sensor for measurement may protrude from the open second end (referring to FIGS. 6A and 6B, for example).

However, it is preferable that the second end is closed, so that a sensor element of the temperature sensor for measurement can be surrounded by the receiving member 706. In this way, good thermal conductivity, mechanical protection and temperature stability between the temperature sensor for measurement and the reference temperature sensor can be realized through heat transfer characteristics of the receiving member and the protective tube.

Other details and examples of the receiving member will be further described later.

Figure 3:
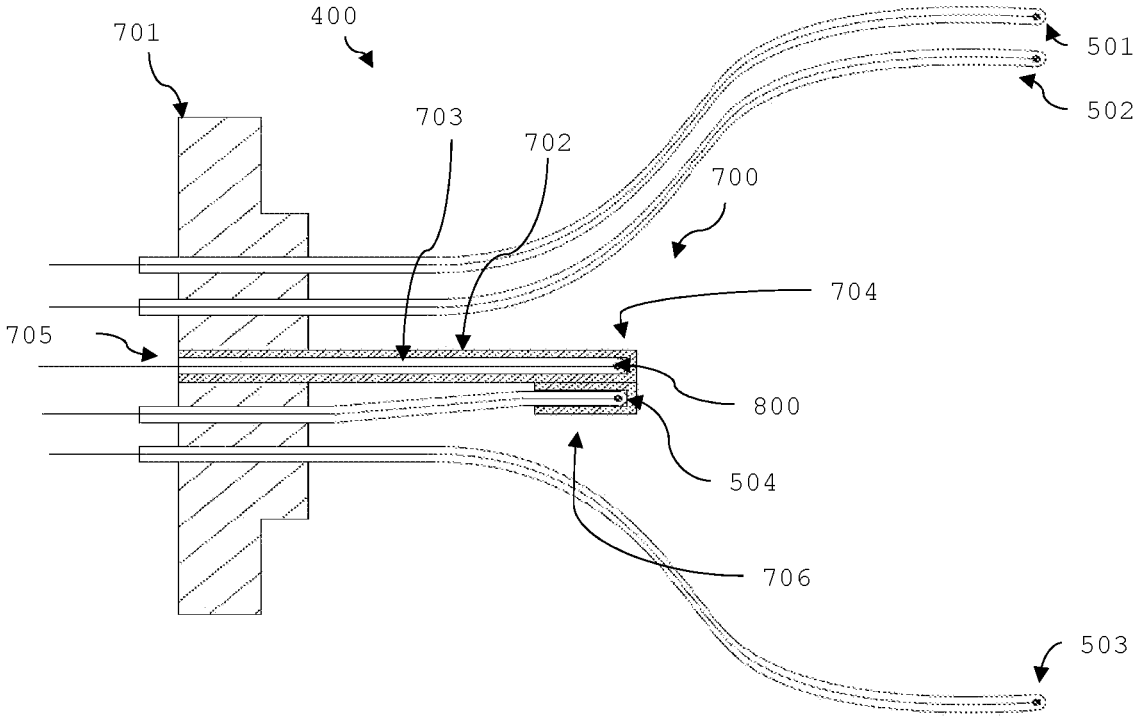
FIG. 3 shows a temperature sensor assembly with a protective tube.

FIG. 3 shows an example of a temperature sensor assembly 400 with a protective tube 700.

In this embodiment, a sealing base element 701 is preferably a flange element. Correspondingly, a process vessel port can be a flange connection. Primary temperature sensors 501, 502 and 503 of a temperature sensor assembly 400 extend into the process vessel through the sealing base element 701. This means that the temperature sensor assembly 400 and a protective tube 700 are inserted into the process vessel from the same process vessel port.

An open proximal end 705 of the protective tube 700 is sealingly connected onto the sealing base element 701. A reference temperature sensor 800 is inserted from the open proximal end 705 of the protective tube 700 via a bore 703.

A receiving member 706 is oriented parallel to a longitudinal axis of the elongate body 702 of the protective tube 700 and is connected onto the elongate body 702 at a closed distal end 704 of the elongate body 702 of the protective tube 700.

A short primary temperature sensor 504 of the temperature sensor assembly 400 is received and held by the receiving member 706 of the protective tube 700 and is close to the reference temperature sensor 800 within the bore of the protective tube 700.

In an example, the receiving member 706 may at least partially comprise a material with high thermal conductivity. It is also possible that the closed distal end 704 also at least partially comprises a material with thermal conductivity. In this case, it is possible to quickly balance a temperature change or a temperature difference between the secondary temperature sensors 601, 602, 601', 602', 603', 601" or the short primary temperature sensor 504 and the reference temperature sensors 800, 800'.

The open proximal end 705 of the elongate body 702 is sealingly closable from the outside of the process vessel 200.

Especially, when the reference temperature sensors 800, 800' are not inserted, or even when the reference temperature sensors 800, 800' have been inserted for a long time, or when the reference temperature sensors have existed or operated within the process vessel for a long time, the open proximal end 705 can be closed to prevent the risk that the elongate body 702 may be damaged. In this case, no fluid can leave the process vessel 200.

The bore 703 of the protective tube 700 may be in fluid communication with a pressure gauge or a pressure sensor for monitoring the internal pressure within the bore 703. The pressure gauge may be arranged outside the process vessel 200 and in fluid communication with the bore 703, or the pressure sensor can also be installed outside the process vessel 200 or even integrated into the elongate body 702.

The bore 703 of the protective tube 700 may also be in fluid communication with a gas analyzer for monitoring the gas composition within the bore 703.

The bore 703 of the protective tube 700 may also be in fluid communication with an inert gas purging arrangement for purging the gas within the bore 703.

In these cases above, the integrity of the protective tube 700 can be monitored. In addition, for example, when the open proximal end 705 is closed, and the pressure within the bore 703 rises or the concentration of a process medium in the gas within the bore 703 rises, it indicates that there may be a leakage, and that as long as the process is going on, the protective tube 700 should not be opened from the outside of the process vessel 200.

Figure 4A:
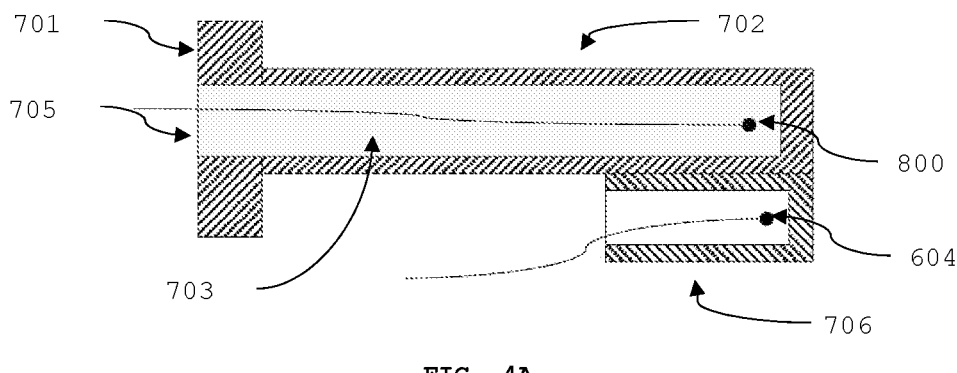
FIGS. 4A-4C show examples of a protective tube with one or more receiving members.
Figure 4B:
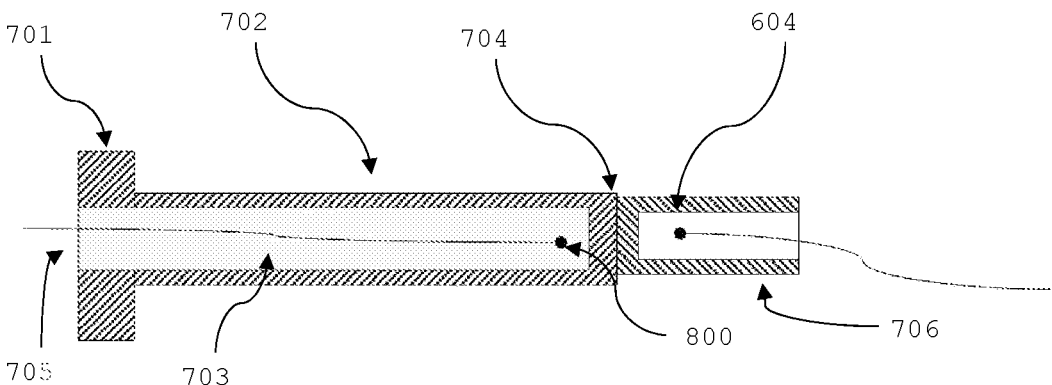
Figure 4C:
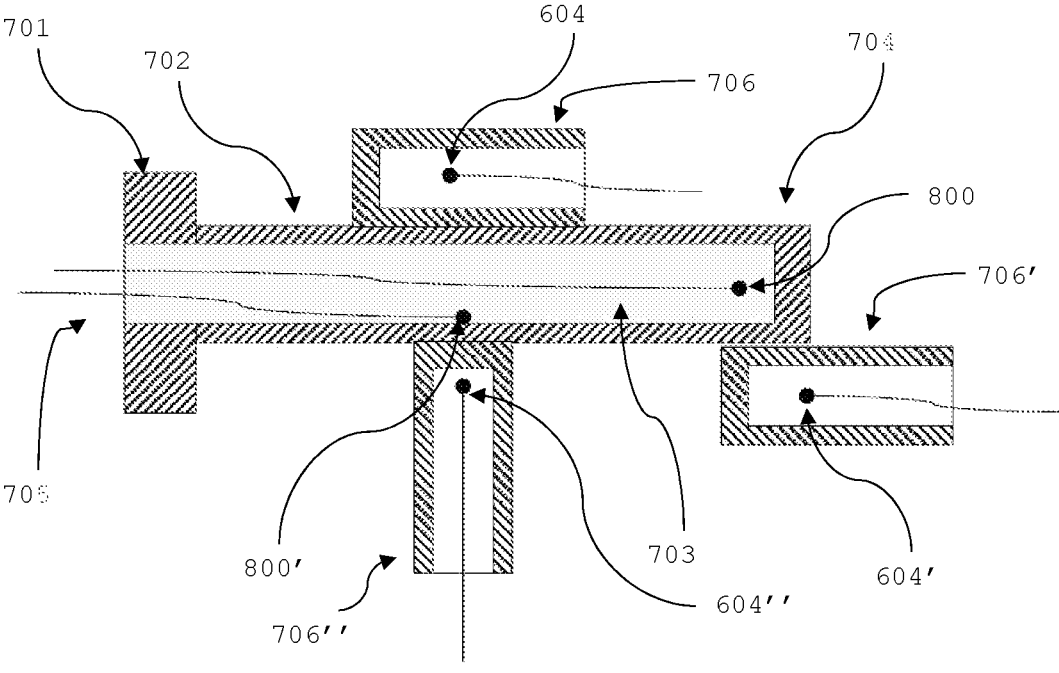

FIGS. 4A to 4C show examples of a protective tube with one or more receiving parts 706, 706' 706".

The embodiment shown in FIG. 4A is similar to the protective tube 700 and the receiving member 706 in FIG. 3, in which the open end of the receiving member is oriented in the same direction as the open end 705 of the protective tube. The main difference is that the temperature sensor inserted in the receiving member is a secondary temperature sensor 604.

In the embodiment shown in FIG. 4B, a receiving member is oriented in parallel to the longitudinal axis of the elongate body 702 and is connected onto the elongate body 702 at the closed distal end 704 of the elongate body 702. In addition, the open end of the receiving member in FIG. 4B is oriented in an opposite direction to the open end 705 of the protective tube.

FIG. 4C shows a protective tube with three receiving members 706, 706', 706". The three receiving members 706, 706', 706" are respectively oriented parallel to or perpendicular to the longitudinal axis of the elongate body 702, and are respectively connected onto the elongate body 702 at a lateral surface of the elongate body 702 or at the closed distal 704 end of the elongate body 702.

Two reference temperature sensors 800, 800' are inserted into the elongate body 702. Secondary temperature sensors 604' and 604" are close to a respective reference temperature sensor 800, 800' respectively.

FIG. 5 shows an example of a temperature sensor arrangement 100 in a combination of several aspects of the invention.

In FIG. 5, a temperature sensor arrangement 100 comprises three temperature sensor assemblies 400, 400' and 400". The process vessel 200 has four process vessel ports 300, 300', 300" and 300'".

In this embodiment, a temperature sensor assembly 400 with two primary temperature sensors 501, 502 and two secondary temperature sensors 601, 602 is introduced into the process vessel 200 through a process vessel port 300.

Among them, the primary temperature sensor 501 is positioned at a measurement location 901 within the process vessel 200.

A first protective tube 700 receiving a reference temperature sensor 800 and having two receiving members 706 is introduced into the process vessel 200 through a process vessel port 300''' and arranged within the process vessel 200. The receiving members 706 are arranged on both sides of the first protective tube 700 in parallel to the longitudinal axis of the first protective tube 700, and respectively receive and hold the secondary temperature sensor 602 of the temperature sensor assembly 400 and the secondary temperature sensor 602' of the temperature sensor assembly 400' independently. The secondary temperature sensors 602, 602' are close to the reference temperature sensor 800, which is inserted into protective tube 700 from the outside of the process vessel 200.

A temperature sensor assembly 400' with two primary temperature sensors 501', 502' and three secondary temperature sensors 601', 602', 603' is introduced into the process vessel 200 through a process vessel port 300'. Among them, the primary temperature sensor 501' is positioned at a measurement location 902' within the process vessel 200.

The secondary temperature sensor 601' of the temperature sensor assembly 400' is positioned within the process vessel 200 close to the primary temperature sensor 501 of the temperature sensor assembly 400, i.e. close to the measurement location 901 of the primary temperature sensor 501. A point for a measurement value comparison between the two temperature sensor assemblies 400, 400 is therefore formed at that measurement location 901.

The primary temperature sensor 502' of the temperature sensor assembly 400' is positioned within the process vessel 200 close to the secondary temperature sensor 601 of the temperature sensor assembly 400, or the secondary temperature sensor 601 of the temperature sensor assembly 400 is close to the measurement location 902' of the primary temperature sensor 502'. A point for a measurement value comparison between the two temperature sensor assemblies 400, 400 is therefore formed at that measurement location 902'.

In addition, the secondary temperature sensor 602 of the temperature sensor assembly 400 and the secondary temperature sensor 602' of the temperature sensor assembly 400' both reach the first protective tube 700 within the process vessel 200 and are received and held by the receiving members 706 of the first protective tube 700. The two secondary temperature sensors 602, 602' are both close to the reference temperature sensor 800 inserted into the bore of the first protective tube 700. Therefore, the two secondary temperature sensors 602, 602' can be calibrated by the reference temperature sensor 800. At the same time, this arrangement forms a reference location 1001, at which measurement values of the two secondary temperature sensors 602 and 602' can be compared.

A temperature sensor assembly 400" with two primary temperature sensors 501", 502" and one secondary temperature sensor 601" is introduced into the process vessel 200 through a process vessel port 300". The temperature sensor assembly 400" also comprises a second protective tube 700', which is inserted into the process vessel 200 at the same process vessel port 300".

The secondary temperature sensor 601" of the temperature sensor assembly 400" and the secondary temperature sensor 603' of the temperature sensor assembly 400' are close to each other at a reference location 1001' within the process vessel 200. A point for a measurement value comparison between the two temperature sensor assemblies 400', 400" is formed at this reference location 1001'.

Another short primary temperature sensor 504" of the temperature sensor assembly 400" can be received and held by a receiving member 706' of the second protective tube 700'. The short primary temperature sensor 504" can be close to a reference temperature sensor 800' inserted into the second protective tube 700', and can be calibrated by the reference temperature sensor 800'.

With these exemplary combinations, a plurality of temperature sensor assemblies 400, 400', 400" can be calibrated and measurement values of these temperature sensor assemblies can be easily compared. The secondary temperature sensors can be used to detect a discrepancy between sensor signals, such as an offset of a single sensor, signs of aging, signal drift and/or failure. In addition, this signal discrepancy can be calibrated by the reference temperature sensors that can be inserted into the protective tubes.

Next, taking all the above embodiments and combinations thereof as examples, a method for a temperature measurement in a process vessel 200 will be explained:

For the process vessel 200 with the above temperature measurement arrangement, firstly, measurement values of the primary temperature sensors 501, 502, 503, 501', 502', 503', 501", 502" and the secondary temperature sensors 601, 602, 601', 602', 603', 601" within the process vessel 200 are taken.

Then, a measurement value difference of the primary temperature sensors 501, 502, 503, 501', 502', 503', 501", 502" and the secondary temperature sensors 601, 602, 601', 602', 603', 601" of different temperature sensor assemblies 400, 400', 400", which are positioned close to each other at certain measurement locations 901, 902, 903, 901', 902', 903', 901", 902", is determined, or a measurement value difference of the secondary temperature sensors 601, 602, 601', 602', 603', 601" of different temperature sensor assemblies 400, 400', 400", which are positioned close to each other at certain reference locations 1001, 1001', is determined.

Then, the determined measurement value differences are stored as reference values.

Then, at a later point in time, the above-mentioned steps of taking the measurement values and determining the measurement value differences are repeated.

Finally, the newly determined measurement value differences are compared with the initially stored reference values to detect a discrepancy in measurement values and/or sensor condition.

In an example of the above mentioned method, the steps of repeating to take the measurement values and determine the measurement value differences and comparing the new measurement value differences with the initially stored reference values, may be automatically executed periodically or may be carried out continuously.

For a process vessel comprising at least two process vessel ports 300, 300', and 300" at different locations, a method for a temperature measurement inside a process vessel 200 comprises following steps in detail:

Firstly, A temperature sensor assembly 400, 400', 400" is inserted into the process vessel 200 at or through each process vessel port 300, 300', 300".

Each temperature sensor assembly comprises at least one primary temperature sensor 501, 502, 503, 501', 502', 503', 501", 502".

Then, each primary temperature sensor 501, 502, 503, 501', 502', 503', 501", 502" is positioned at a measurement location 901, 902, 903, 901', 902', 903', 901", 902" inside the process vessel 200.

Then, each secondary temperature sensor 601, 602, 601', 602', 603', 601" of each temperature sensor assembly 400, 400" is positioned close to the measurement location 901, 902, 903, 901', 902', 903, 901", 902" of one of the primary temperature sensors 501, 502, 503, 501', 502', 503', 501", 502" from a different one of the temperature sensor assemblies 400, 400', 400", or close to a reference location 1001, 1001' of one of the secondary temperature sensors 601, 602, 601', 602', 603', 601" from a different one of the temperature sensor assemblies 400, 400', 400".

Then, measurement values of the primary temperature sensors 501, 502, 503, 501', 502', 503' and the secondary temperature sensors 601, 602, 601', 602' within the process vessel 200 are taken.

Finally, a measurement value difference of the primary temperature sensors 501, 502, 503, 501', 502', 503', 501", 502" and the secondary temperature sensors 601, 602, 601', 602', 603', 601" of different temperature sensor assemblies 400, 400', 400", which are positioned close to each other at certain measurement locations 901, 902, 903, 901', 902', 903', 901", 902", is determined, or a measurement value difference of the secondary temperature sensors 601, 602, 601', 602', 603', 601" of different temperature sensor assemblies 400, 400', 400", which are positioned close to each other at certain reference locations 1001, 1001', is determined. Thereby, measurement value discrepancies of individual temperature sensors and/or individual temperature sensor assemblies are detected.

Figure 6A:
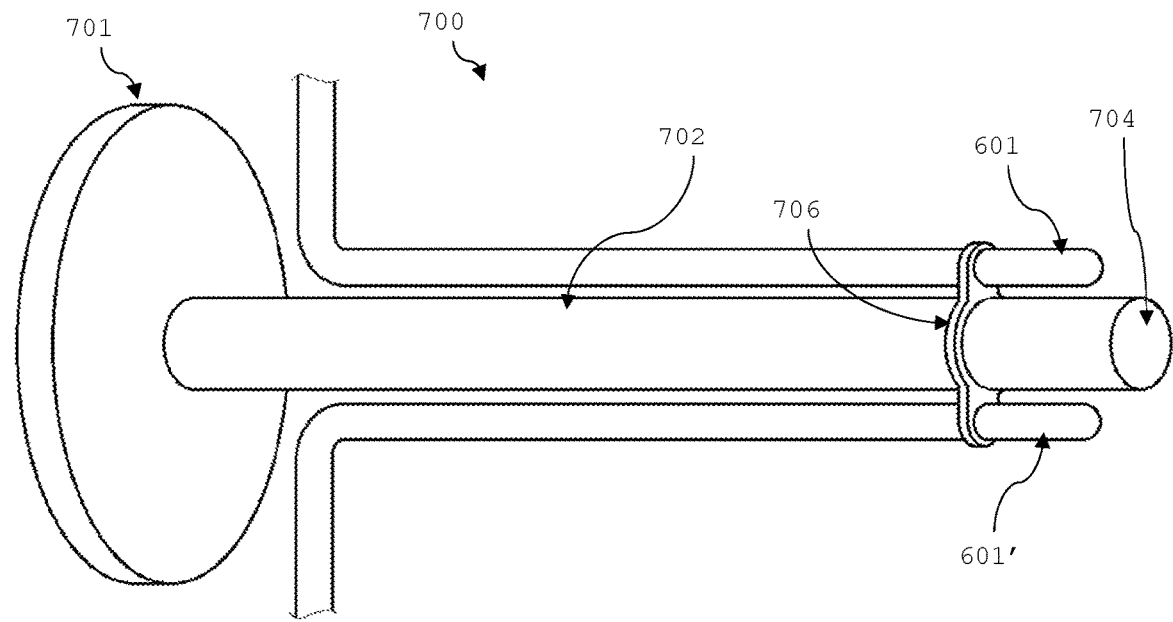
FIGS. 6A-6B show examples a protective tube with a receiving member.
Figure 6B:
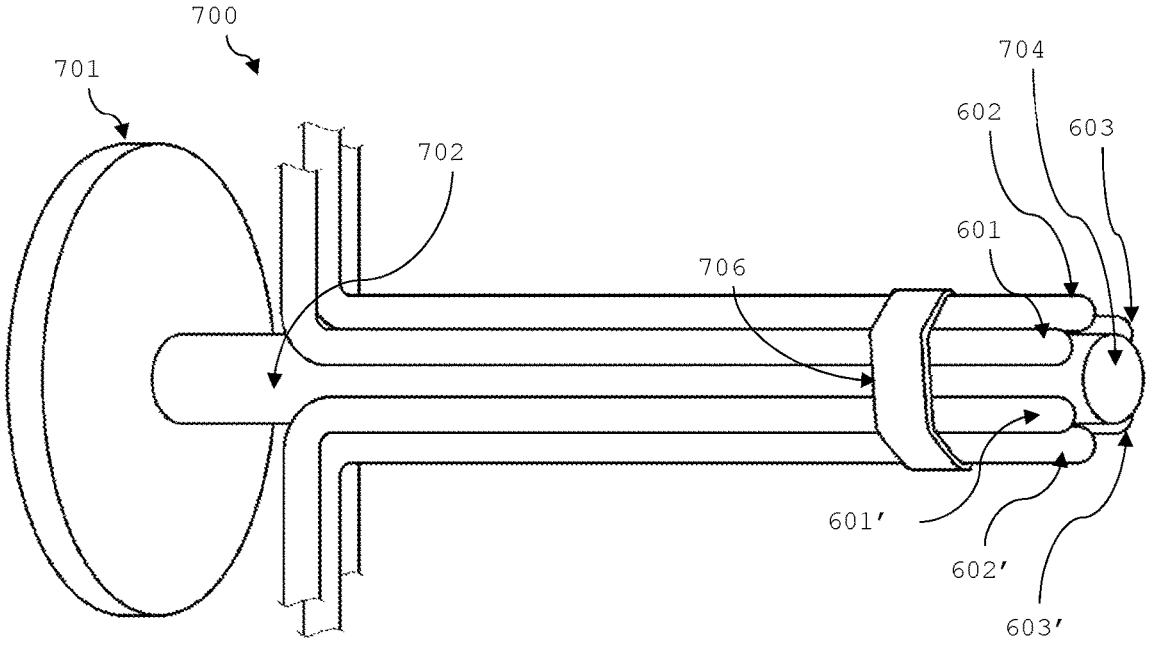

FIGS. 6A and 6B show exemplary embodiments of a protective tube 700 with a receiving member 706. In these embodiments, the receiving member 706 can receive at least two secondary temperature sensors 601, 601', 602, 602', 603, 603'.

Especially, in applications where the secondary temperature sensors 601, 601', 602, 602', 603, 603' do not need to be mechanically shielded or protected, the receiving member 706 can only be presented as a clamp, an annular body or a similar bracket, so that the secondary temperature sensors are simply fastened on the lateral surface of the elongate body 702.

FIG. 6A shows a protective tube 700 with a receiving member 706. In this embodiment, the receiving member 706 does not have a cylindrical body that completely surrounds ends of the secondary temperature sensors 601, 601'. Instead of the cylindrical body structure, the receiving member 706 is presented as a holding plate. The holding plate has openings through which the elongate body 702 of the protective tube 700 and the secondary temperature sensors 601, 601' pass. Clip-like or similar structures of the receiving member 706 are of course conceivable.

In this embodiment, the secondary temperature sensors or the short primary temperature sensor held by the receiving member 706 is not particularly protected. Therefore, the sensors thus arranged are exposed to and influenced by the environment existed in the process vessel 200, just like all the primary temperature sensors 501, 502, 503, 501', 502', 503' arranged within the process vessel 200. Therefore, in this case, if the sensors thus arranged are influenced for some reason or in some way, such as being polluted and/or influenced by a sensor drift, this influence can be detected by comparing with the measurement value of the reference temperature sensor (not shown in this figure) arranged within the protective tube 700, thereby protecting the secondary temperature sensors or the short temperature sensor from such influence and/or at least enabling the operator of a temperature sensor arrangement to detect signs of such influences early and plan maintenance accordingly.

FIG. 6B shows another embodiment of the receiving member 706. In this embodiment, the receiving member 706 may be an annular body, a forging band, a strip or the like. The receiving member can receive a plurality of secondary temperature sensors 601, 601', 602, 602', 603, 603' and press these secondary temperature sensors on the elongate body 702 of the same protective tube 700. Each secondary temperature sensor 601, 601', 602, 602', 603, 603' can come from or belong to different temperature sensor assemblies.

The embodiment shown in FIG. 6B can achieve advantages similar to the embodiment shown in FIG. 6A.

Embodiments, examples, variations or drawings of the present invention, including their different views or corresponding unique features, can be used independently of each other or in any combination. The features described in connection with one embodiment is applicable to all embodiments as long as these features are not mutually exclusive.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A temperature sensor arrangement for temperature measurements within a process vessel, the process vessel comprising at least two process vessel ports at different locations of the process vessel,
   wherein at or through each process vessel port a temperature sensor assembly is inserted into the process vessel,
   wherein each temperature sensor assembly comprises at least one primary temperature sensor, which is positioned at a measurement location within the process vessel,
   wherein at least one of the temperature sensor assemblies comprises at least one secondary temperature sensor, and
   wherein each of the secondary temperature sensors of that temperature sensor assembly is positioned close to the measurement location of one of the primary temperature sensors from a different one of the temperature sensor assemblies, or close to a reference location of one of the secondary temperature sensors from a different one of the temperature sensor assemblies.

2. The temperature sensor arrangement according to claim 1, wherein at least one of the secondary temperature sensors of one of the temperature sensor assemblies is in direct mechanical contact with the primary temperature sensor or the secondary temperature sensor from a different one of the temperature sensor assemblies positioned close thereto.

3. The temperature sensor arrangement according to claim 1, wherein at least one temperature sensor assembly comprises a sheathed single-point thermocouple temperature sensor, wherein a thermocouple junction within the sheath forms one of the primary temperature sensors or one of the secondary temperature sensors; and/or at least one temperature sensor assembly comprises a sheathed multi-point thermocouple temperature sensor with a sheath, wherein a series of thermocouple junctions within the sheath are arranged and distributed over a length of the sheath and form a series of the primary temperature sensors or a series of the secondary temperature sensors.

4. The temperature sensor arrangement according to claim 1, wherein at least one temperature sensor assembly comprises a bundle of at least two sheathed thermocouple temperature sensors; and/or at least one temperature sensor assembly comprises at least two primary temperature sensors which are arranged at different measurement locations, wherein the measurement locations are arranged and distributed along a line essentially parallel or essentially perpendicular to a longitudinal axis of the process vessel or the measurement locations are distributed within a plane that is arranged essentially perpendicular to the longitudinal axis of the process vessel.

5. The temperature sensor arrangement according to claim 1, wherein the primary temperature sensors and/or the secondary temperature sensors of one of the temperature sensor assemblies are of a different type than the primary temperature sensors and/or the secondary temperature sensors of the different one of the temperature sensor assemblies.

6. The temperature sensor arrangement according to claim 1, further comprising:

a protective tube, the protective tube comprising:

a sealing base element, which connects onto an additional process vessel port that is provided in addition to the at least two process vessel ports; and an elongate body with a bore, the elongate body comprising a closed distal end, and an open proximal end that is sealingly connected onto the sealing base element, wherein a reference temperature sensor is adapted to be insertable into the bore and extractable from the bore from outside the process vessel, wherein a receiving member is connected or attached onto the elongate body inside the process vessel, wherein at or through the additional process vessel port, the protective tube is inserted into the process vessel, wherein the at least one secondary temperature sensor of the at least one of the temperature sensor assemblies is routed inside the process vessel to reach the receiving member of the protective tube, the receiving member being adapted to receive and hold the at least one secondary temperature sensor from inside the process vessel, and wherein the receiving member receives and holds the at least one secondary temperature sensor close to the reference temperature sensor inside the bore of the protective tube.

7. The temperature sensor arrangement according to claim 6, wherein another temperature sensor assembly is inserted into the process vessel at or through the additional process vessel port, and wherein a short primary temperature sensor of the other temperature sensor assembly is received and held by the receiving member of the protective tube.

\* \* \* \* \*